US008441352B2

(12) United States Patent
Sizemore

(10) Patent No.: US 8,441,352 B2
(45) Date of Patent: May 14, 2013

(54) PERSONAL SECURITY BACKPACK AND METHOD

(75) Inventor: Edric D Sizemore, Richton Park, IL (US)

(73) Assignee: Inventive Concepts International, LLC, Elk Grove Village, IL (US)

(\*) Notice: Subject to any disclaimer, the term of this patent is extended or adjusted under 35 U.S.C. 154(b) by 668 days.

(21) Appl. No.: 12/709,318

(22) Filed: Feb. 19, 2010

(65) Prior Publication Data

US 2011/0205057 A1 Aug. 25, 2011

(51) Int. Cl.
*G08B 13/14* (2006.01)
*G08B 13/00* (2006.01)
*G08B 23/00* (2006.01)
*H04R 3/00* (2006.01)

(52) U.S. Cl.
USPC ............... 340/568.6; 340/574; 340/573.1; 340/693.5; 381/122

(58) Field of Classification Search ............ 340/574, 340/573.1, 693.5, 568.6, 328, 326, 571; 348/61; 381/122, 367
See application file for complete search history.

(56) References Cited

U.S. PATENT DOCUMENTS

| | | | |
|---|---|---|---|
| 3,696,380 A | 10/1972 | Murphy | |
| 4,591,835 A * | 5/1986 | Sharp | 340/574 |
| 5,748,089 A | 5/1998 | Sizemore | |
| 6,044,257 A | 3/2000 | Boling et al. | |
| 6,118,375 A | 9/2000 | Duncan | |
| 6,130,616 A | 10/2000 | Sizemore | |
| 6,181,246 B1 | 1/2001 | Ewing et al. | |
| 6,226,510 B1 | 5/2001 | Boling et al. | |
| 6,281,800 B1 | 8/2001 | Sizemore | |
| 6,772,057 B2 | 8/2004 | Breed et al. | |
| 6,927,685 B2 | 8/2005 | Wathen | |
| 7,009,512 B2 | 3/2006 | Cordoba | |
| 7,042,338 B1 | 5/2006 | Weber | |
| 7,092,695 B1 | 8/2006 | Boling et al. | |
| 7,248,170 B2 | 7/2007 | DeOme et al. | |
| 7,251,471 B2 | 7/2007 | Boling et al. | |
| 7,359,782 B2 | 4/2008 | Breed | |
| 7,385,507 B2 | 6/2008 | Simpson et al. | |
| 7,414,535 B2 | 8/2008 | Hanabusa et al. | |
| 7,421,321 B2 | 9/2008 | Breed et al. | |
| 7,446,650 B2 | 11/2008 | Scholfield et al. | |
| 7,535,358 B2 | 5/2009 | Crider et al. | |

(Continued)

OTHER PUBLICATIONS

PCT/US11/21868 Written Opinion of the International Searching Authority, Apr. 11, 2011.

(Continued)

*Primary Examiner* — Ahn V La
(74) *Attorney, Agent, or Firm* — Cardinal Law Group; Ronald E. Andermann

(57) ABSTRACT

A personal security backpack and method of use include a portable container having a first compartment and a second compartment, the second compartment having an audible alarm siren window for transmission of an audible siren; a strap attached to the portable container; and an alarm system responsive to at least one activation signal, the alarm system includes an alarm system circuit removably disposed in the second compartment; an audible alarm siren operably connected to the alarm system circuit and responsive to the activation signal to generate the audible siren; and a microphone operably connected to the alarm system circuit, the microphone being responsive to the activation signal, responsive to a user voice, and selectively unresponsive to the audible siren to generate a voice signal.

28 Claims, 6 Drawing Sheets

U.S. PATENT DOCUMENTS

| | | |
|---|---|---|
| 7,538,688 B1 | 5/2009 | Stewart |
| 7,548,168 B2 | 6/2009 | Ishikawa et al. |
| 7,551,076 B2 | 6/2009 | Tyroler |
| 2003/0163827 A1 | 8/2003 | Purpura |
| 2005/0200487 A1 | 9/2005 | O'Donnell et al. |
| 2006/0170545 A1 | 8/2006 | Terui |
| 2006/0266563 A1 | 11/2006 | Kaplan |
| 2006/0267779 A1 | 11/2006 | Ishikawa et al. |
| 2008/0074265 A1 | 3/2008 | Schoen et al. |
| 2009/0066065 A1 | 3/2009 | Breed et al. |
| 2009/0096635 A1 | 4/2009 | McKenna |
| 2009/0146813 A1 | 6/2009 | Nuno |
| 2009/0160670 A1 | 6/2009 | Sipple |
| 2010/0163591 A1 | 7/2010 | Stutz et al. |

OTHER PUBLICATIONS

GPS Pet Tracking devices. Article [online]. GPS-practice-and-fun. com, 2009 [retrieved on Aug. 16, 2009]. Retrieved from Internet : <URL: http://www.gps-practice-and-fun.com/gps-pet-tracking. html>.

Raymarine Lifetag Wireless MOB System W/Base Station/2 TAGS. Article [online]. Green Point Marine Construction, Inc., 2007 [retrieved on Aug. 16, 2009]. Retrieved from Internet : <URL: http:// www.greenpointmarine.com/catalog/raymarine-lifetag-wireless-mob-system-wbase- . . . >.

\* cited by examiner

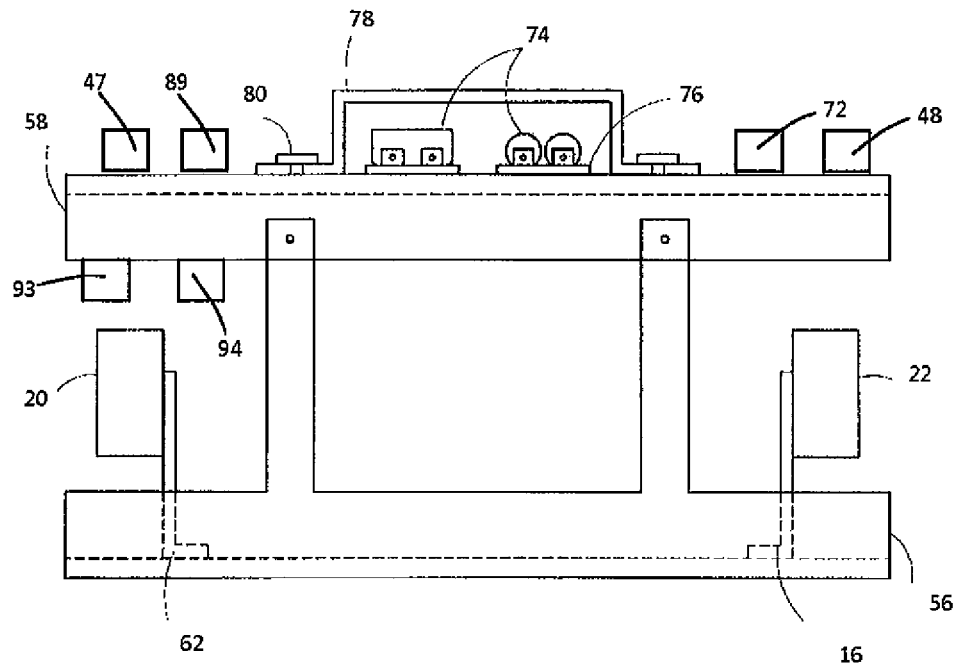
FIG. 8
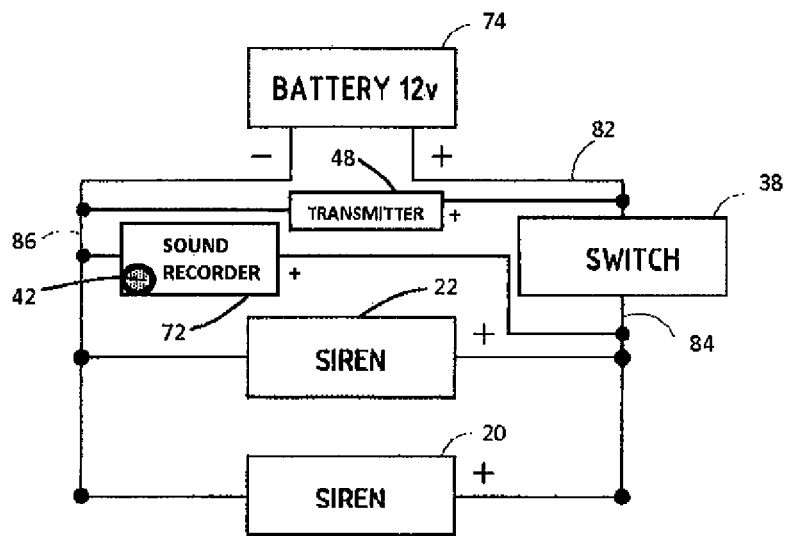
FIG. 9     12 VOLT MULTI ALARM CIRCUIT

PERSONAL SECURITY BACKPACK AND METHOD

TECHNICAL FIELD

The present invention relates to a personal security devices. More particularly, the present invention teaches an improved portable personal security backpack having an audio alarm for attracting attention and a location specific microphone that is concealed within a conventional-appearing backpack and capable of communicating with remote security personnel in an emergency situation.

BACKGROUND

The dangers associated with personal attacks and crimes continue to consume evening television and radio news broadcasts and fill the pages of newspapers throughout North America and other places in the world, particularly in urban areas. One practical solution is the use of audible alarm devices by law-abiding citizens to attract attention to themselves when confronted by a criminal intent on committing a violent act. Unfortunately, loud audible sounds that act as effective deterrents by such devices make verbal communications by the backpack user or other nearby persons indistinguishable from siren sounds or generally unintelligible.

It would be desirable to have a personal security backpack that has an alarm system concealed within a conventional-appearing backpack that include sirens that upon activation produce loud audible sounds aimed at attracting attention to backpack theft and any related an emergency situation, but overcomes the problem of being able to distinguish a user's voice received by a microphone attached to the backpack by instantly communicating audibly clear verbal communication with emergency personnel of the user's voice.

SUMMARY OF THE INVENTION

One aspect of the invention provides a personal security backpack having a portable container having a first compartment and a second compartment, the second compartment having an audible alarm siren window for transmission of an audible siren; a strap attached to the portable container; and an alarm system responsive to at least one activation signal, the alarm system includes an alarm system circuit removably disposed in the second compartment; an audible alarm siren operably connected to the alarm system circuit and responsive to the activation signal to generate the audible siren; and a microphone operably connected to the alarm system circuit, the microphone being responsive to the activation signal, responsive to a user voice, and selectively unresponsive to the audible siren to generate a voice signal.

Another aspect of the invention provides a personal security backpack system having a portable container with a first compartment and a second compartment having an audible alarm siren window for transmission of an audible siren; a strap attached to the portable container; an alarm system responsive to at least one activation signal, the alarm system including: an alarm system circuit board removably disposed in the second compartment; an audible alarm siren operably connected to the alarm system circuit and responsive to the activation signal to generate an audible siren; a microphone operably connected to the alarm system circuit, the microphone being responsive to the activation signal, responsive to a voice of the user, and selectively unresponsive to the audible siren to generate a voice signal; an alarm transmitter operably connected to the alarm system circuit and responsive to the activation signal to generate and to transmit the activation signal to a security monitoring center; an activation receiver operably connected to the alarm system circuit, the activation receiver being operable to receive the activation signal to activate the alarm system, the activation signal being generated by a remote transmitter operable to transmit the activation signal to the activation receiver; a global positioning system (GPS) tracking and transmission device operably connected to the alarm system circuit, the GPS tracking and transmission device being responsive to the activation signal to generate a backpack location; a camera operably connected to the alarm system circuit, the camera being responsive to the activation signal to generate a picture or a video; a strobe light operably connected to the alarm system circuit, the strobe light being responsive to the activation signal to generate a warning light; and an audio recording device operably connected to the alarm system circuit, the audio recording device being responsive to the activation signal to record sound detected by the microphone.

In yet another aspect of the invention, a method of using a personal security backpack system includes providing a personal security backpack system having a portable container with a first compartment and a second compartment having an audible alarm siren window for transmission of an audible siren; a strap attached to the portable container; an alarm system responsive to at least one activation signal, the alarm system including: an audible alarm siren operably connected to the alarm system circuit and responsive to the activation signal to generate an audible siren; a microphone operably connected to the alarm system circuit, the microphone being responsive to the activation signal, responsive to a voice of the user, and selectively unresponsive to the audible siren to generate a voice signal; an alarm transmitter operably connected to the alarm system circuit and responsive to the activation signal to generate and to transmit the activation signal to a security monitoring center; and an activation receiver operably connected to the alarm system circuit, the activation receiver being operable to receive the activation signal to activate the alarm system, the activation signal being generated by a remote transmitter operable to transmit the activation signal to the receiver; and activating the alarm system to generate the activation signal; generating the audible siren from the audible alarm siren in response to the activation signal; speaking into the microphone responsive to generate the voice signal, the microphone being selectively unresponsive to the audible siren; and transmitting the activation signal to the security monitoring center.

BRIEF DESCRIPTION OF THE DRAWINGS

FIG. 8 is a cross-sectional view of modular electronic components of an embodiment of the personal security backpack of the present invention; and FIG. 9 is a general circuit diagram of electronic components for an embodiment of the personal security backpack of the present invention.

DETAILED DESCRIPTION

Figure 1:
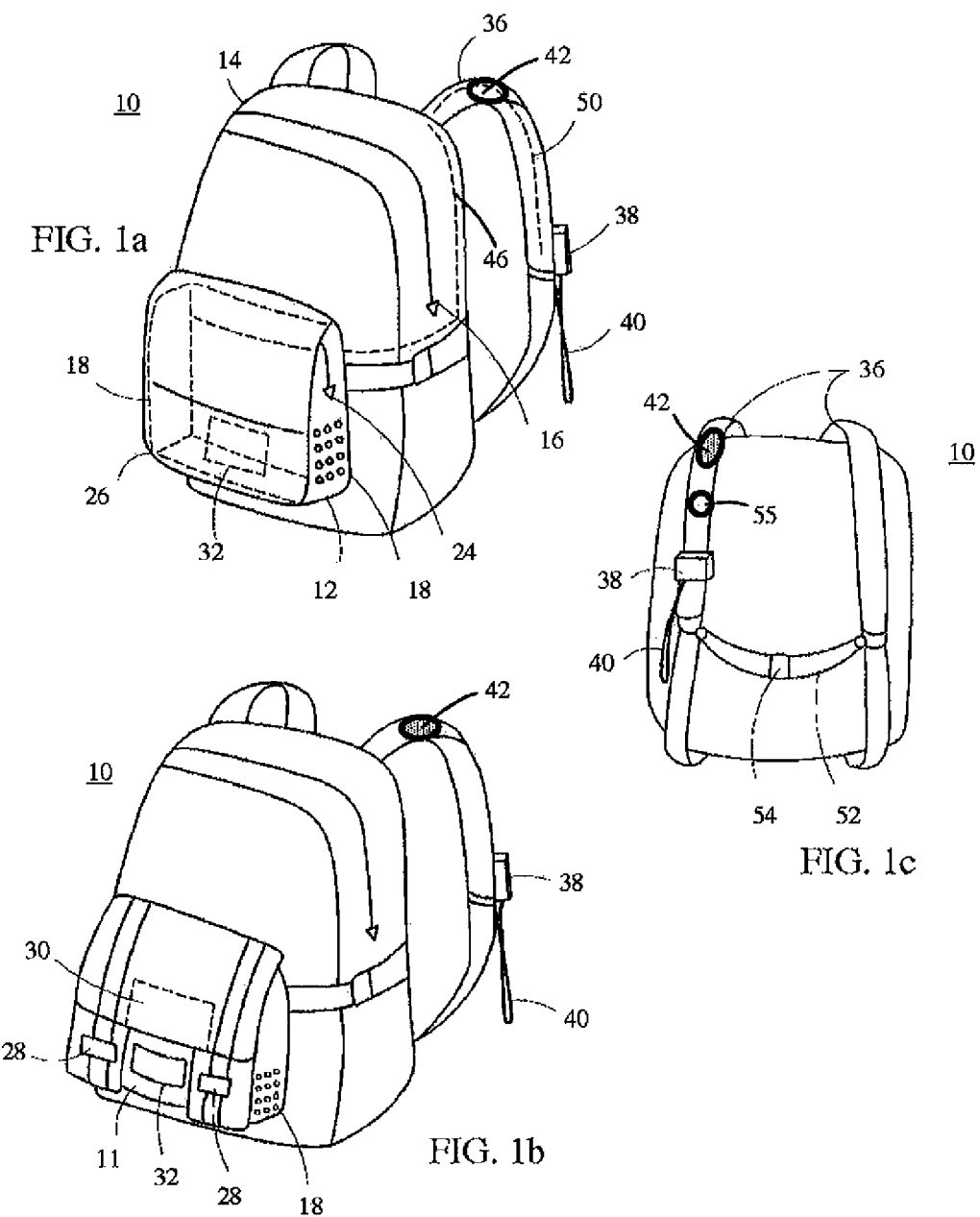
FIGS. 1a, 1b, and 1c are perspective views of a first embodiment of the personal security backpack of the present invention having a microphone and a panic switch wiring configuration.

Referring to FIGS. 1a, 1b, and 1c, a first embodiment of the personal security backpack for application of the present invention is shown. Beside just a backpack, the present invention acts as a personal security backpack system for warning of and attracting attention to an emergency situation. In this aspect, the system includes a personal security backpack 10 including a source of electrical power, a first compartment 14 within which personal items may be carried; and a second compartment 12 having an alarm system. The alarm system includes an audible alarm system in selective electrical contact with a source of electrical power and a siren window for emitting audible warning sounds of an intensity and direction when the alarm is activated so as to warn persons nearby of the emergency and/or theft of the backpack. The backpack 10 provides at least one shoulder strap 36 adapted to allow the backpack to be carried on a user's back. Optionally, an anti-theft strap 54 is attached to and interconnects the plurality of shoulder straps 36 such that the personal security backpack cannot be removed with the anti-theft strap in place.

The backpack is a portal container having a compartment 14 within which personal items may be carried and a second or electronic component compartment 12 having an alarm system that includes a number of electrically driven components that are operably connected, particularly an audible alarm system in selective electrical contact with the source of electrical power. A siren window 18 for emitting audible warning sounds of an intensity and direction when the alarm is activated generally renders the user's voice inaudible, particularly when audible warning sound from the siren of the audible alarm system is louder than 95 db. At least one microphone 42 is operably connected to the security backpack and proximate to the user's mouth. The microphone is responsive to the user's voice and selectively unresponsive to the alarm siren and other background noise so that microphone can detect an otherwise inaudible user's voice during activation of the audible alarm system. In an embodiment the at least one microphone 42 is secured to at least one shoulder strap 36 so as to be proximate to the user's mouth wherein the microphone can detect and distinguish the user's voice during activation of the audible alarm system.

A second compartment having the alarm system is located at a lower portion of the backpack preferably away from the microphone. An externally accessible alarm panic switch 38 is mounted on one of the pair of shoulder straps of the backpack, the switch having an "on" and "off" position, whereby placing the switch in the "on" position places said audio alarm siren in electrical contact with said battery pack to activate said audio alarm siren to attract the attention of nearby persons. The panic switch can include pull out pin, such that the presence of the pull out pin corresponds to the switch "off" position and the absence of the pull out pin corresponds to the switch "on" position, whereby pulling the pull out pin from the switch activates the audio alarm siren and the audio alarm siren may be deactivated only when the pull out pin is reinserted into the switch.

Figure 4A:
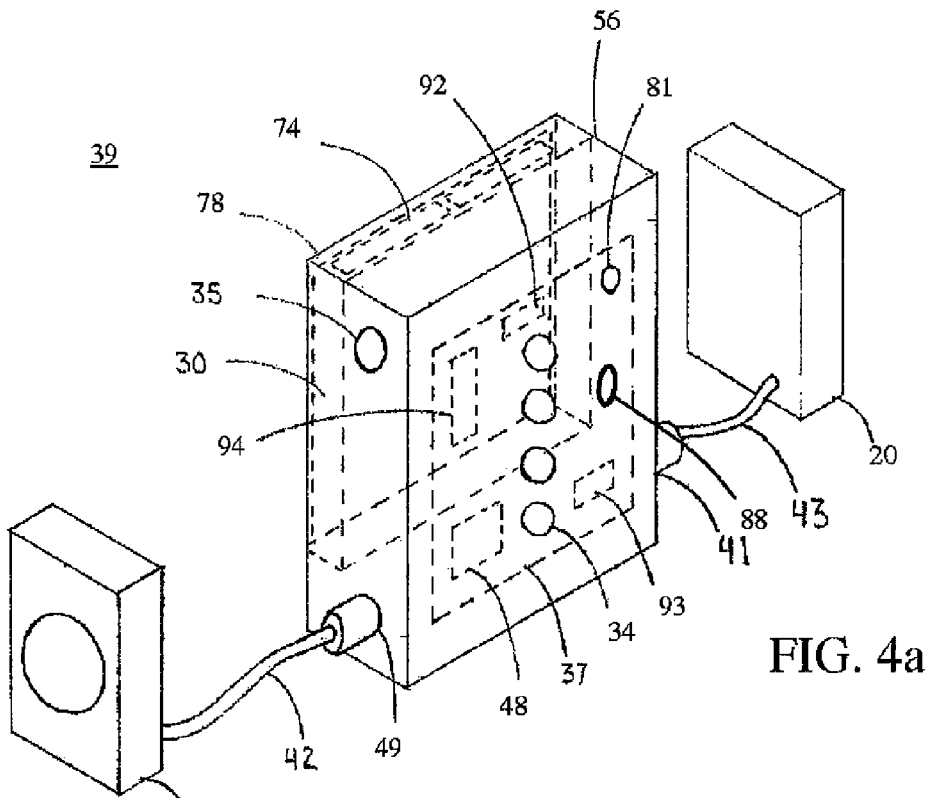
FIG. 4a is a perspective view of electronic components for a modular alarm system of an embodiment of the personal security backpack of the present invention.
Figure 4B:
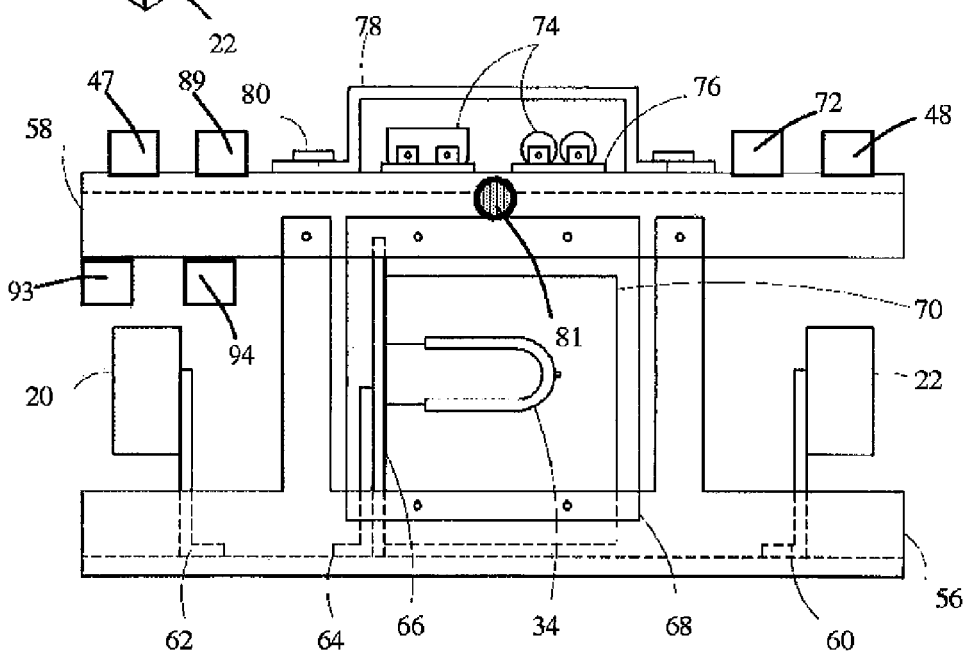
FIG. 4b is a cross-sectional view of the alarm system electronic components of an embodiment of the personal security backpack of the present invention.

The first or carrying compartment 14 opens to reveal a spacious and fairly conventional backpack compartment with closures or double zippers 16. The component compartment 12 houses the first embodiment of the alarm system of the present invention, the details of which are better shown in FIGS. 4a and 4b, as discussed below. A series of small openings including, but not limited to, covered mesh openings, are provided on each opposite lateral side of the component compartment 12 to form opposing siren windows 18 by which the audible siren of the present invention may by heard un-muffled and directly in nearly 360 degrees. By using a pair of sirens 20, 22 (as shown in FIGS. 4a and 4b), the probability of the audible alarm generator being pointed toward an area where there may be no observers is largely avoided. Thus, the effectiveness of the audible alarm is improved.

The second or electronic component compartment 12 opens and fastens closed with double zippers 24. In an embodiment, the component compartment 12 comprises three small interior pockets such as interior pockets 15, 17, 19 shown in more detail in FIG. 3. The pockets receive and hold the multi signal alarm system 39 including the two sirens 20, 22, the details of which are better shown in FIG. 4b. In yet another embodiment, the component compartment 12 further comprises a strobe light window 32 to emit the visual signal from the multi signal alarm system of the present invention. The strobe window 32 may be simply a cut out section of the front wall of the component compartment 12, as shown in FIG. 1b, although a window-like covering, such as acetate, a mesh material, and so forth can also be beneficially and preferentially used to protect the interior from dust, dirt, moisture, etc. By virtue of the fact that both the audio alarm and the visual alarm means are disposed within the backpack worn on a user's back, their respective heights are increased and the effectiveness of the overall alarm system is improved.

The personal security backpack optionally includes an automatic locking system. For example, the automatic locking system may include an electronic device that engages double zipper 24 to prevent zipper movement. Alternatively and as commonly known, if component compartment 12 closure includes a latching mechanism, the automatic locking system may be a device that engages the latching mechanism so a to prevent releasing of the latch and thus preventing access to items placed inside the backpack.

In use, the automatic locking system protects the security and safety of important personal items within the backpack or bag by triggering an automatic locking system upon activation of the alarm system. Upon alarm activation the automatic locking system prevents access to the main compartment and/or the component compartment of the backpack or bag while the alarm system, simultaneously activates the sirens, strobe light, GPS, microphone and wireless communication. Simultaneous activation draws attention to the theft and thus provides a quick recovery of the stolen backpack or bag while keeping personal items secure. Upon deactivating the alarm system, the automatic locking system, which can be electronically operated, will unlock or disengage so as to provide access to any secured compartments.

In a further embodiment, the component compartment 12 is optionally covered with a water resistant compartment flap 26 that is retained in place through detachable buckles 28, as is conventionally known. In this embodiment, the compartment flap 26 further comprises a smaller rectangular strobe flap 30 that is capable of being folded underneath the compartment flap 26 to reveal the strobe window 32 through which a strobe lamp 34 (as shown in FIGS. 4a and 4b) may be seen. The strobe flap 30 is preferably retained in the folded position to the inside of the flap 26 by conventional hook and loop fasteners (Velcro®) when the user believes that the security function might be needed, although other fastening means, such as snaps and hooks can be used. In other situations, the strobe flap 30 is unfolded to lie flat against the rear and along with the rest of the flap 26 to protect the strobe window 32 from damage.

The backpack 10 is shown with two carrying straps or shoulder straps 36. Additional carrying straps or a single carrying strap may be used as specific designs may require. Mounted on one carrying strap 36 is a panic switch 38 having a pull out strap pin 40 that activates and deactivates the alarm system shown in FIGS. 4a and 4b. The pin 40 is preferably an audio-style bayonet plug that is received within a switch and confidently retained in position until intentionally withdrawn. In addition, mounted on the same shoulder or carrying strap 36 or the other carrying strap is a microphone 42 to provide communication with a security monitoring center 44 (discussed with FIG. 6) or emergency personnel. As known in the art, the panic switch can also be a remote control electronic key fob transmitter 45 that can communicate with either a receiver 47 located in the alarm system 39 inside the backpack or the security monitoring center 44. The electronic key fob transmitter 45 having a pressure sensitive switch coupled with an activation receiver disposed within the component compartment can serve as a panic switch, such that the system is activated only upon depression of the pressure sensitive switch and deactivated only upon turning the arming switch to the "unarmed" position.

Figure 5:
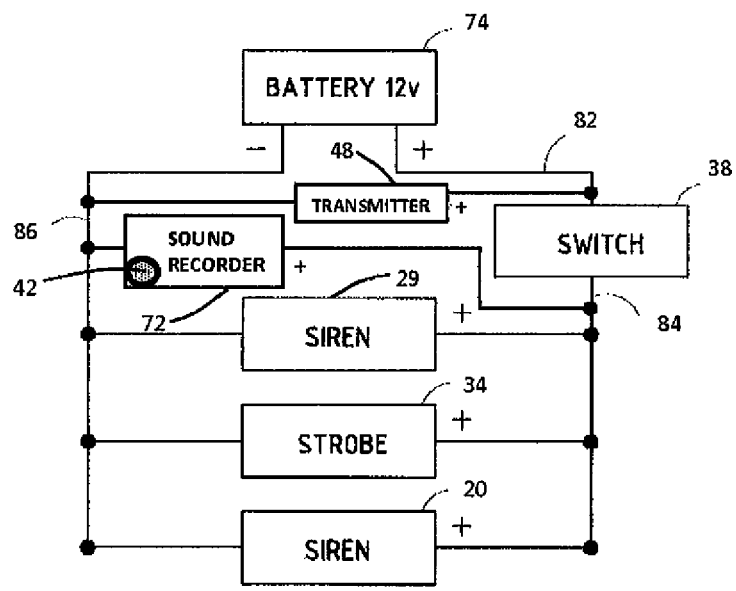
FIG. 5 is a general circuit diagram of electronic components for a first embodiment of the personal security backpack of the present invention.

As shown in FIG. 1a, the microphone 42 is electrically connected to the component compartment 12 via wiring bundle 46 through the carrying strap 36, around the carrying compartment 14, and into the component compartment 12 to radio frequency (RF) transmitter 48 (shown in FIGS. 4a, 4b, and 5). As shown in more detail in FIG. 1a, the panic switch 38 is electrically connected to the component compartment 12 via switch wiring bundle 50 through the carrying strap 36 and connects to wiring bundle 46 that goes around the carrying compartment 14 and into the component compartment 12. In FIG. 1c, the backpack 10 is shown with preferred adjustable anti-theft strap 52 attached to and interconnecting the two shoulder carrying straps 36. When properly buckled at buckle 54, the anti-theft strap is largely effective to prevent the backpack 10 from becoming accidentally removed or removed by a perpetrator. A camera 55 can be attached to or placed inside of the shoulder strap 36 for viewing and recording video of the emergency situation. The camera 55 is electrically connected to the component compartment 12 via camera wiring bundles 46 and 50 through the carrying strap 36, around the carrying compartment 14 and into the component compartment 12. The switch wiring and the camera wiring can be a single wiring bundle to reduce the cost of installation and provide a more secure wiring connection by reinforcing of cladding the wiring bundle.

The microphone 42 can be attached to the surface of one shoulder strap 36 or placed within the fabric of the strap. The microphone 42 should be located on the upper portion of the strap 36 to be reachably proximate to the user's mouth. In this position the user's mouth can be brought close to the microphone 42 by appropriate positioning of the user's head. An omnidirectional microphone can be used. Alternatively, the microphone can be part of a headset or earpiece that is worn by the user and is communicatively connected to the alarm system and a transmitter. Preferably, the microphone is a directional microphone, including but not limited to, cardioid microphones, hypercardioid microphones or a bidirectional microphones. A cardioid microphone has "heart-shaped" sound sensitivity pattern, which is the type of pick-up pattern these microphone use. Sound is detected primarily from the front, but to a lesser extent the sides as well. A hypercardioid, an exaggerated version of the cardioid pattern, is very directional and eliminates most sound from the sides and rear. Due to the long thin design of hypercardioids, they are often referred to as shotgun microphones. A bidirectional microphone uses a figure-of-eight pattern and picks up sound equally from two opposite directions. A variable directionality microphone, which allows the user to vary the directional characteristics by selecting omnidirectional, cardioid, or hypercardioid patterns can also be used. When the user is carrying the personal security backpack 10 and activates the sirens 20 and 22 and strobe 34 by means of the panic switch 38, the microphone 42 and transmitter 48 (see, FIG. 6) are activated. The transmitter 48 establishes contact with the security monitoring center 44 (see, FIG. 6). The user can communicate with the security monitoring center 44 while the sirens 20 and 22 (see, FIGS. 4a and 4b) are activated and the user's mouth is positioned in close proximity to the microphone 42. The microphone 42 may include noise canceling circuitry to reduce the effect of the noise generated by the sirens in order that the user's voice may be more clearly understood by the security monitoring center. Further, as the sirens 20 and 22 can be located within the component compartment 12, at the lower end of the backpack 10, a distance away from the user's head and mouth, so as to reduce the impact of the noise from the sirens 20 and 22 on verbal communications. The distance between the sirens 20 and 22 and the microphone 42, in combination with noise canceling circuitry associated with the microphone 42 and the ability to speak directly into the microphone permits the security monitoring center 44 to hear and understand the user's voice and respond to the emergency situation.

Although the size and shape of the backpack can vary, the preferable size is 13 inches wide by 17 inches high by 8½ inches deep. As best seen in FIG. 1a, the personal security backpack 10 is provided with a component compartment 12 and large carrying compartment 14. The personal security alarm bag may be constructed from materials, such as, but not limited to nylon, leather, micro fiber or polyester, but is preferably constructed from 1000 denier DuPont Cordura nylon.

Figure 2:
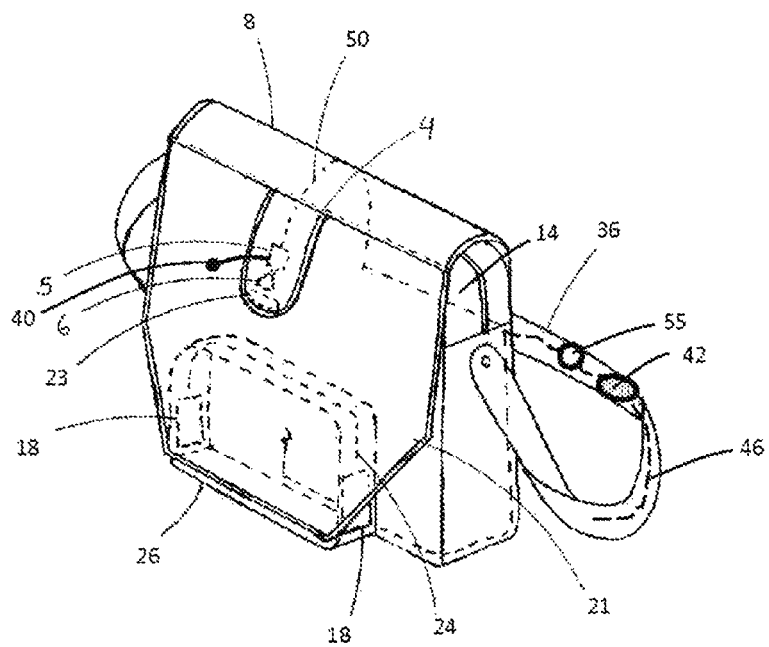
FIG. 2 is a perspective view of an embodiment of the personal security system applied to a shoulder bag of the present invention as it might be carried by a user.
Figure 3:
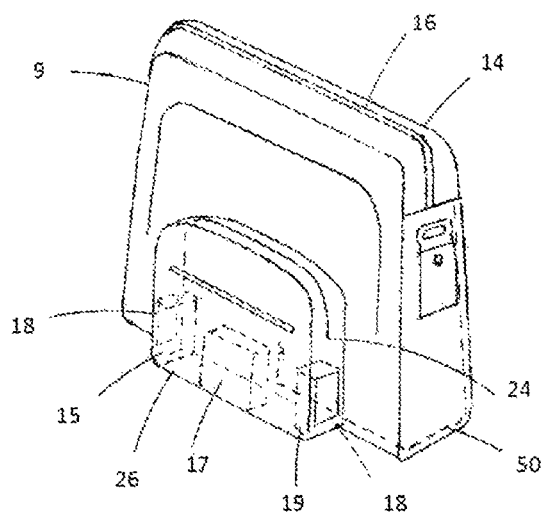
FIG. 3 is a perspective view of an embodiment of the personal security system applied to a handbag of the present invention as it might be carried by a user.

While the invention is discussed in use with a backpack, the invention can readily be incorporated into personal carry-all, such as, but not limited to a shoulder bag, backpack, purse or fanny pack. Alternate embodiments of the personal security backpack of the present invention are shown in FIGS. 2 and 3. While the features of this invention are illustrated primarily showing a backpack as the carryall of choice, the invention is applicable to other carryalls such as but not limited to a shoulder bag, backpack, purse or fanny pack. The discussion of the bag 8 in FIG. 2 and the shoulder bag 9 in FIG. 3 refer to the same reference numbers as in the previous discussion when closely related elements are discussed. The carrying compartment 14 of the shoulder bag 9 opens compartment with a closure such as double zippers 16. The component compartment 26 comprises three small interior pockets 15, 17, 19 for housing the multi signal alarm system 39 and two sirens 20, 22, the details of which are better shown in FIG. 4b. Small interior pockets 15, 19 which are designed to secure the sirens 20, 22 inside the shoulder bag 9 are proximate to mesh openings 18, to enable the sirens 20, 22 signals to be emitted from the shoulder bag 9. The center interior pocket 17 is designed to secure the multi signal alarm system 39 inside the shoulder bag 9, optionally, to secure the multi signal system 39 proximate to a strobe light window 32, as shown in FIG. 1a. By using a pair of sirens 20, 22 (as shown in FIG. 4b), the probability of the audible generator being pointed toward an area where there may be no observers is largely avoided.

The main flap 21 further comprises a small panic switch cover flap 4 which covers and conceals the panic switch 5 and is held in the closed position with Velcro 23 and operates as discussed hereinabove. A microphone 42 and camera 55 can be mounted on the shoulder strap 36 or the water resistant main flap 21 and connected to the RF transmitter 48 with microphone wiring bundle 46.

Referring to FIG. 4a, the preferred multi signal alarm system 39 that is placed inside the backpack 10 of the present invention is designed as a modular interchangeable alarm which allows the sirens, lights and the base of the alarm system to be moved from a secured component compartment of a first backpack or bag and install in a secured compartment of a different alarm bag. As a module, the multi signal alarm system 39 comprises an alarm system circuit that includes a circuit board, a battery compartment, and sirens that are interconnected to create a complete system. The circuit board 37 contains several electronic components such as multiple LEDs to create a strobe light circuit 34, a global positioning transmitter 94, global positioning receiver 93, a wireless radiofrequency transmitter 48, a wireless radiofrequency receiver 47, a microphone line input 88, an activation switch input line 35 connecting wiring in bundle 46 from the panic switch 38, which is attached to the shoulder strap 36 of the backpack 10. The sirens 20, 22, which are connected respectively to siren inputs 41, 49, and should be loud enough to generate and attract attention from significant distances, preferably at a decibel level of from about 95 dB to about 130 dB. Such decibel levels will generally make words inaudible when spoken near the backpack, the siren source.

Alternatively, as shown in FIG. 4b, any number of electronic components that are part of the alarm system of the present invention can be mounted on a plastic injection molded base 56 and a battery base 58. Two siren braces 60 and 62 are attached, preferably by screws, into the base 56. Siren brace 60 supports siren 22 and siren brace 62 supports siren 20, such that each of the sirens 20, 22 are positioned proximate to siren windows 18 when installed within the component compartment 12 and opposite each other. For this alternate embodiment, a circuit board brace 64 is attached to the base 56 and supports a strobe light circuit board 66, which further comprises a xenon flash tube 34. To protect the xenon flash tube 34, a clear rectangular heat resistant and shatter resistant strobe cover 68 is screwed into the base 56 and the battery base 58. The flash tube 34 is situation such that it is visible through strobe window 32 when installed in component compartment 12. A three-paneled reflector plate 70 having panels angled at 45 degrees is mounted to the strobe light circuit board 66 behind the xenon flash tube 34 to intensify and increase the apparent size of the xenon flash tube 34 so as to improve the visibility of the visual signal.

For embodiments shown in either FIG. 4a or 4b, a receiver 47 which activates the alarm upon receipt of a signal from the electronic key fob 45 is mounted to the alarm system. A sound recorder 72 and transmitter 48 attached to microphone wiring bundle 46 which can record and transmit the user's voice upon activation of the alarm. A battery pack 74 fastens into a battery holder and is protected by a battery cover 78. The circuit board of the alarm system circuit further comprises a battery power indicator 81 to measure the available power remaining in the battery pack 74. As shown, replacement of the batteries requires only opening the component compartment 12 and detachment of the battery cover 78, and does not require the carrying compartment 14 to be emptied so that access to the batteries can be obtained. However, since the battery cover in a secure location which reduces the possibility of an assailant being able to quickly disable the alarm system. A rechargeable battery pack may be included with an electrical plug-in recharging device to replace the use of disposable batteries.

As shown in FIG. 5, an alarm system circuit diagram for one embodiment of the present invention is shown. Because of the electronic nature of the alarm system, the personal security backpack includes a source of electrical power, such as disposable batteries, rechargeable batteries, rechargeable power pack, and so forth. The battery pack 74 is preferably 9 to 18 volts DC. A positive line 82 is connected to the panic switch 38. A panic switch line 84 is connected in series with the positive lines to each of the first siren 20, strobe light circuit board 34 and the second siren 22, each connected in parallel. The negative lines of these electronic components are connected to the battery pack's negative line 86 to complete the systems circuit.

In operation, the first embodiment of the personal security backpack of the present invention is easy to operate with high effectiveness. Preferably, since worn on the back and presented to the surroundings at a height above ground level, the strobe lamp 34 is more visible. Also, with sirens 20, 22 directed in directions opposite each other, the audible alarm is more readily heard. If the optional strobe flap 30 is provided, it needs to be folded under to expose the strobe 34 before using the visual alarm signal; however, if the strobe flap 30 is not so folded, the sirens 20, 22 will still activate. No arming switch is necessary. The personal security backpack of the present invention is always armed and ready for use.

To use the first embodiment of the personal security backpack of the present invention, the user simply grasps with one hand the pull out strap pin 40 of the panic switch 38, which by virtue of their location on the straps 36 remains near the user's chest and available at all times. When a threat arises, the user simply pulls the pull out strap pin 40, closing the circuit to the sirens 20, 22 and light strobe 34. The sirens 20, 22 activate and emit a loud distinctive noise through the sound windows 18, while the strobe lamp 34 emits a visual signal that is visible significant distances from the scene. The activation of the sirens 20 and 22 and strobe also activate the microphone 42 and camera 55. In addition, the microphone 42 is connected to a transmitter which transmits a signal generated by the user's voice to a security monitoring center. The signal generated from input to the microphone can be transmitted by RF transmitter 48. Thus, the voice signal can be used as an activation signal sent to the remote monitoring center. Similarly, video from the camera 55 can be stored by video recorder 89 or transmitted to the security monitoring center 44. After the alarm has been activated, the user may reinsert the pin 40 into the panic switch 38 to turn the system off. A particularly beneficial feature is that during an emergency, the user can simply activate the alarm with the pull out strap pin 40 and then throw the pull out strap pin away as the user moves away from the threat, thus making it nearly impossible to quickly disable the alarm and preventing the criminal from quickly turning off the siren.

Figure 6:
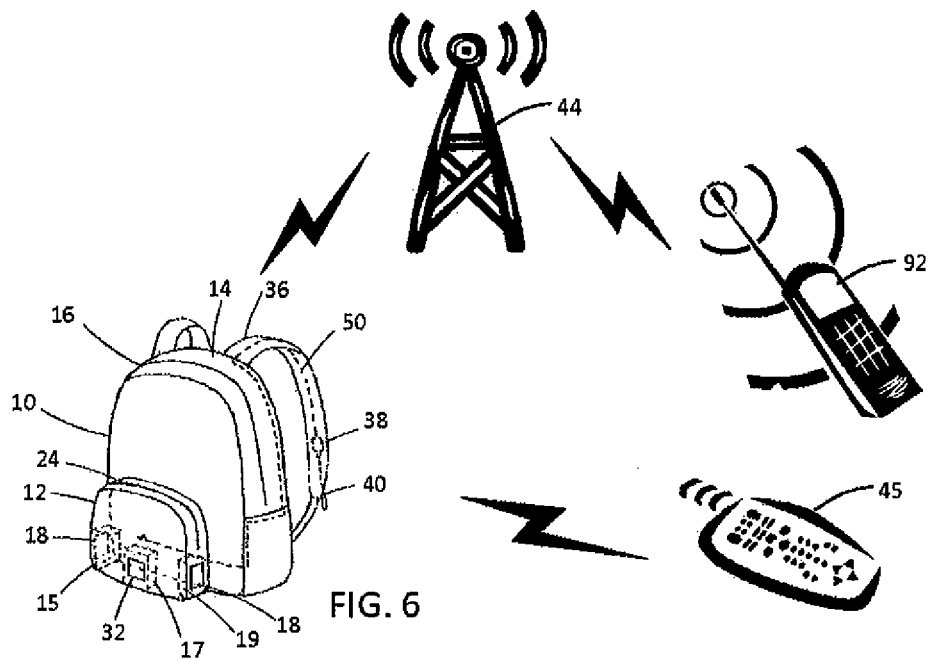
FIG. 6 schematically illustrates the present invention transmitting a signal to the security monitoring center.

Another embodiment, a personal security backpack system, includes the personal security backpack 10 combined with transmitting a signal to a security monitoring center as shown in FIG. 6. In this embodiment, the transmission receiver receives a wireless signal for activating the audible alarm siren such as a signal from a security monitoring center.

Alternately, upon activation, the alarm system transmits a security signal to the security monitoring center. Optionally, upon activation, the alarm system can transmit a signal that provides a backpack location determined by the GPS tracking device. Upon reception of the security signal, the security monitoring center can transmit a wireless signal to the transmission receiver in the personal security backpack which activates the alarm system as a whole or activates specific components like the GPS tracking device for tracking a backpack location, the camera for taking a video, and so forth. In another embodiment, the security signal is a telephonic signal generated by dialing a phone number specific to the backpack, and a wireless signal is a signal generated by the phone system and sent to the transmission receiver in the personal security backpack to activate the alarm system as a whole or to activate individual components. In another embodiment, the security signal includes an electronic code specific the backpack alarm system. The security signal with the embedded code is transmitted to the security monitoring center, which upon reception of the signal the security monitory center transmits the wireless signal to the transmission receiver which activates the alarm. Thus, in the event that the personal security backpack 10 is taken from the user or left behind by the user, the user can active the sirens 20 and 22 and the strobe 34 by using a remote activation device 92. Alternately, the remote activation device 92 activates specific components such as the GPS tracking device, the camera, and so forth.

A non-limiting example is a remote activation device 92 in the form of a cell phone. For this example, the user can dial a number specific for the personal security backpack 10 or alternatively dial a general number for the security monitoring center 44 and then enter a specific code designated for the personal security backpack 10. The security monitoring center 44 then transmits a signal to a receiver 47, located in the personal security backpack 10, thereby activating the alarm, which includes the sirens 20 and 22 and the strobe 34. The activation of the sirens 20 and 22 and the strobe 34 will deter one in improper possession of the personal security backpack 10 and ideally causing them to abandon the personal security backpack. Upon recovery of the personal security backpack, the user can deactivate the alarm by pressing a deactivation switch on an electronic key fob or remote 45 or by calling the designated phone number and entering an appropriate code to deactivate the alarm, including the sirens 20 and 22 and the strobe 34. Alternatively and as discussed above, in situations when the backpack is close to, yet separated from the user, the user can activate the alarm sirens 20 and 22, and the flash tube 34 by depressing a switch on the electronic key fob 45. These activation methods provide alternative means for the user to activate the alarm system when the backpack is separated from user and within range of the fob transmitter or outside the range of the fob.

Further, alarm system activation can include the receiving or generation of a plurality of activation signals that activate the individual electronic components of the alarm system. For example, the activation of the sirens 20 and 22 and the strobe 34 can also activate a global positioning system (GPS) transponder 93 and transmitter 94 located on the alarm system. In another embodiment, a global positioning system (GPS) tracking and transmission device is operably connected to the alarm system, wherein the GPS tracking and transmission device is activated during activation of the alarm. The location of the personal security backpack 10 can be tracked by information sent to the security monitoring center 44. The tracking system is not necessarily limited to a GPS transponder system, but can be other tracking system including, but not limited to, those based on radio frequency. In the event that the personal security backpack 10 is separated from the user, the GPS signal can be used for prompt recovery of the personal security backpack 10. In another embodiment, a camera is provided for recording of video images during activation of the alarm. In another embodiment, an audio recording device records sound detected by the microphone. In another embodiment, the camera is attached to a radio frequency transmitter, wherein the video images from the camera are transmitted to a security monitoring center.

Figure 7:
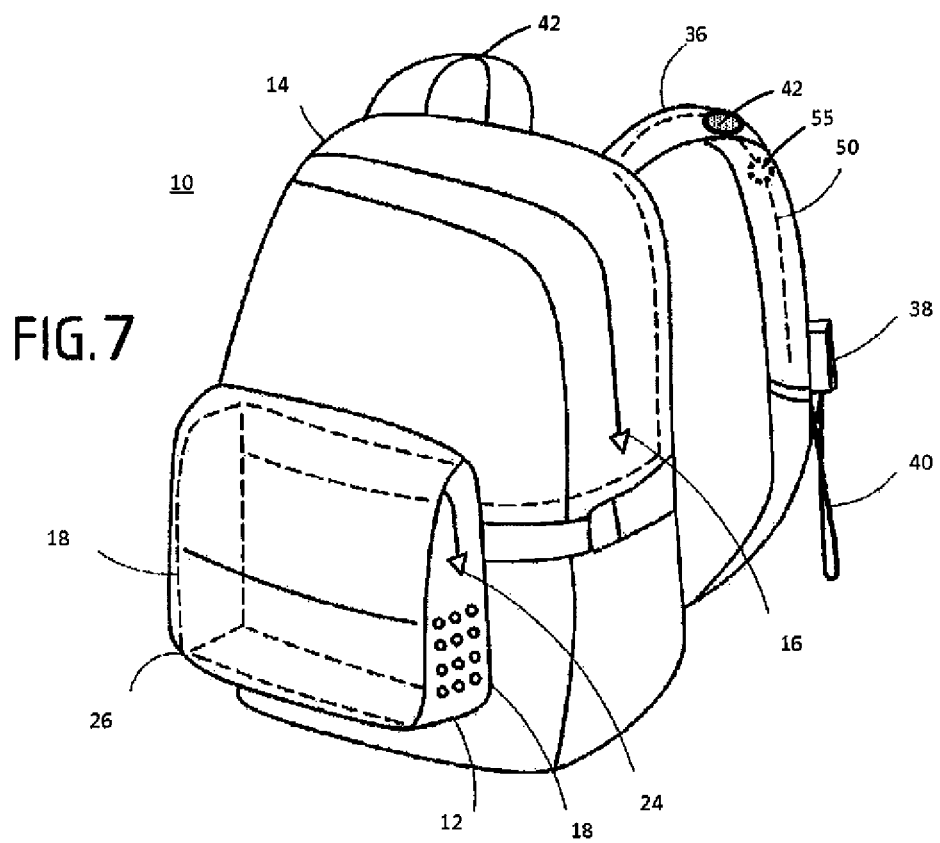
FIG. 7 is a perspective view of an embodiment of the personal security backpack of the present invention including a camera.

Yet another embodiment of the personal security backpack of the present invention is shown in FIG. 7. The backpack is similar in virtually all respects to the first embodiment of the present invention shown in FIGS. 1a, 1b, and 1c, except that the embodiment does not include a visual alarm. In this embodiment, the backpack 10 is provided with small openings on either side of component compartment 12 to form opposing siren windows 18 by which the audible siren of the present invention may be heard unmuffled in virtually all directions.

In FIG. 8, electronic components of the alarm system of the present invention are shown. Again, electronic components are virtually the same as that of the first embodiment, except that the electronic components necessary to provide the visual alarm system have been eliminated. Similarly, FIG. 9 shows the alarm system circuit diagram for the second embodiment that is similar to that previously shown in FIG. 5, with the exception of the elimination of the strobe lamp 34.

The use of these alternate embodiments of the personal security backpack of the present invention is virtually the same as that described above. The user simply grasps, with one hand, the pullout strap pin 40 from the panic switch 38 and pulls the pullout strap pin 40, closing the circuit to the sirens 20, 22. The sirens 20, 22 activate to emit a loud distinctive noise through the sound windows 18. As above, the alarm may be deactivated by reinserting the pin 40 into the panic switch 38 to turn the system off.

A benefit of this embodiment of the personal security backpack is the lower cost associated with eliminating the strobe lamp 34 and associated circuitry, as well as the lower power consumption by the same, in further view of the fact that no additional steps need be taken to prepare the system for use, such as folding up the flap 30 of the first embodiment.

The personal security backpack of the present invention will increase the likelihood of a person escaping violent crimes, as well as deter criminals by providing users with several simultaneous distress alarm signals heard and seen from great distances from the crime scene. These signals will inform any and every person, preferably within a significant radius, that the user is being threatened, therefore warding the perpetrator away from the scene and promoting assistance from fellow citizens or law enforcement officials. It should also be noted that the personal security backpack of the present invention can be used by emergency personal to locate the user in a smoke-filled room to avoid the hazard of fire, to locate an otherwise incapacitated user or to startle and ward off stray dogs or other animals, and is therefore ideal for backpacking and hiking as well as urban settings.

The objects of the invention have thus been attained in an economical, practical, and facile manner. To wit, an effective and convenient personal security backpack contains an immediately available alarm device which may be conveniently carried as an ordinary accessory so to naturally fit in and effectively camouflaged the embedded alarm system. While preferred embodiments and example configurations of the invention have been herein illustrated, shown and described, it is to be appreciated that various changes, rearrangements and modifications may be made therein, without departing from the scope of the invention as defined by the appended claims. It is intended that the specific embodiments and configurations disclosed are illustrative of the preferred and best modes for practicing the invention, and should not be interpreted as limitations on the scope of the invention as defined by the appended claims and it is to be appreciated that various changes, rearrangements and modifications may be made therein, without departing from the scope of the invention as defined by the appended claims.

The invention claimed is:

1. A personal security backpack comprising:
a portable container having a first compartment and a second compartment, the second compartment having an audible alarm siren window for transmission of an audible siren;
a strap attached to the portable container;
and an alarm system responsive to at least one activation signal, the alarm system comprising:
an alarm system circuit removably disposed in the second compartment;
an audible alarm siren operably connected to the alarm system circuit and responsive to the activation signal to generate the audible siren; and
a microphone operably connected to the alarm system circuit, the microphone being responsive to the activation signal, responsive to a user voice, and selectively unresponsive to the audible siren to generate a voice signal.

2. The personal security backpack of claim 1, wherein the microphone is connected to the strap and positioned adjacent to a user mouth.

3. The personal security backpack of claim 1, wherein the microphone is part of a head set or an earpiece.

4. The personal security backpack of claim 1, wherein the microphone is selected from the group consisting of an omnidirectional microphone, a cardioid microphone, a hypercardioid microphone, and a bidirectional microphone.

5. The personal security backpack of claim 1, the alarm system further comprising an alarm transmitter operably connected to the alarm system circuit and responsive to the activation signal to generate and transmit a security signal to a security monitoring center.

6. The personal security backpack of claim 1, further comprising an anti-theft strap attached to the strap.

7. The personal security backpack of claim 1, further comprising an alarm panic switch mounted on the strap and operably connected to the alarm system circuit, the alarm panic switch having a first switch position for alarm system activation and a second alarm position for alarm system deactivation.

8. The personal security backpack of claim 1, the alarm system further comprising an activation receiver operably connected to the alarm system circuit, the activation receiver being operable to receive the activation signal to activate the alarm system, the activation signal being generated by a remote transmitter operable to transmit the activation signal to the activation receiver.

9. The personal security backpack of claim 8, wherein the remote transmitter generates the activation signal in response to entering an electronic key fob code or phone number specific to the alarm system.

10. The personal security backpack of claim 1, wherein a sound level from the audible alarm siren is at least 95 db.

11. The personal security backpack of claim 1, the alarm system further comprising a global positioning system (GPS) tracking and transmission device operably connected to the alarm system circuit, the GPS tracking and transmission device being responsive to the activation signal to generate a backpack location.

12. The personal security backpack of claim 1, the alarm system further comprising a camera operably connected to the alarm system circuit, the camera being responsive to the activation signal to generate a picture or video.

13. The personal security backpack of claim 1, the alarm system further comprising an audio recording device operably connected to the alarm system circuit, the audio recording device being responsive to the activation signal to record sound detected by the microphone.

14. The personal security backpack of claim 1, the alarm system further comprising an automatic locking system operably connected to the alarm system circuit, the automatic locking system being responsive to the activation signal to limit access to an interior of the personal security backpack.

15. The personal security backpack of claim 1, the alarm system further comprising a strobe light operably connected to the alarm system circuit, the strobe light being responsive to the activation signal to generate a visible warning light.

16. A personal security backpack system comprising:
a portable container having a first compartment and a second compartment having an audible alarm siren window for transmission of an audible siren;
a strap attached to the portable container;
an alarm system responsive to at least one activation signal, the alarm system comprising:
an alarm system circuit board removably disposed in the second compartment;
an audible alarm siren operably connected to the alarm system circuit and responsive to the activation signal to generate an audible siren;
a microphone operably connected to the alarm system circuit, the microphone being responsive to the activation signal, responsive to a voice of the user, and selectively unresponsive to the audible siren to generate a voice signal;
an alarm transmitter operably connected to the alarm system circuit and responsive to the activation signal to generate and to transmit a security signal to a security monitoring center;
an activation receiver operably connected to the alarm system circuit, the activation receiver being operable to receive the activation signal to activate the alarm system, the activation signal being generated by a remote transmitter operable to transmit the activation signal to the activation receiver;
a global positioning system (GPS) tracking and transmission device operably connected to the alarm system circuit, the GPS tracking and transmission device being responsive to the activation signal to generate a backpack location;
a camera operably connected to the alarm system circuit, the camera being responsive to the activation signal to generate a picture or a video; and an audio recording device operably connected to the alarm system circuit, the audio recording device being responsive to the activation signal to record sound detected by the microphone.

17. The personal security backpack system of claim 16, the alarm system further comprising a strobe light operably connected to the alarm system circuit, the strobe light being responsive to the activation signal to generate a warning light.

18. A method for using a personal security backpack system comprising:

providing a personal security backpack system comprising:
- a portable container having a first compartment and a second compartment having an audible alarm siren window for transmission of an audible siren;
  - a strap attached to the portable container; an alarm system responsive to at least one activation signal, the alarm system comprising: an audible alarm siren operably connected to the alarm system circuit and responsive to the activation signal to generate an audible siren;
  - a microphone operably connected to the alarm system circuit, the microphone being responsive to the activation signal, responsive to a voice of the user, and selectively unresponsive to the audible siren to generate a voice signal;
  - an alarm transmitter operably connected to the alarm system circuit and responsive to the activation signal to generate and to transmit a security signal to a security monitoring center; and
  - an activation receiver operably connected to the alarm system circuit, the activation receiver being operable to receive the activation signal to activate the alarm system, the activation signal being generated by a remote transmitter operable to transmit the activation signal to the receiver;
- activating the alarm system to generate the activation signal;
- generating the audible siren from the audible alarm siren in response to the activation signal;
- speaking into the microphone responsive to generate the voice signal, the microphone being selectively unresponsive to the audible siren; and
- transmitting the activation signal to the security monitoring center.

19. The method of claim 18, wherein the activating the alarm system includes manipulating a panic switch attached to the strap and having a first position for activation of the alarm system.

20. The method of claim 18, wherein the activating the alarm system includes transmitting the activation signal generated by the remote transmitter to the activation receiver to generate the activation signal to activate the alarm system.

21. The method of claim 18, further comprising securing an anti-theft strap to the strap.

22. The method of claim 18, wherein the generating the audible siren from the audible alarm siren produces a sound level from the audible alarm siren of at least 95 db.

23. The method of claim 18, further comprising tracking a location of the portable container with the global positioning system (GPS) tracking and transmission device operably connected to the alarm system circuit and responsive to the activation signal to generate a backpack location.

24. The method of claim 18, further comprising recording of video images and pictures with the camera operably connected to the alarm system circuit and responsive to the activation signal to generate a picture or a video.

25. The method of claim 24, further comprising transmitting the picture or the video the security monitoring center.

26. The method of claim 18, further comprising recording sounds detected by the microphone with an audio recording device operably connected to the alarm system circuit and responsive to the activation signal to record sound detected by the microphone.

27. The method of claim 18, further comprising locking a closure device attached to the portable container and operably connected to the alarm system circuit, the closure device being responsive to the activation signal to limit access to an interior of the portable container.

28. The method claim 18, further comprising emitting a visible warning light from a strobe light operably connected to the alarm system circuit and responsive to the activation signal to generate the visible warning light.

* * * * *